United States Patent
Fridman et al.

(10) Patent No.: US 12,417,215 B2
(45) Date of Patent: *Sep. 16, 2025

(54) OUTPUT VALIDATION OF DATA PROCESSING SYSTEMS

(71) Applicant: Palantir Technologies Inc., Denver, CO (US)

(72) Inventors: Sharon Fridman, London (GB); Andrei Spatariu, London (GB)

(73) Assignee: Palantir Technologies Inc., Denver, CO (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/435,216

(22) Filed: Feb. 7, 2024

(65) Prior Publication Data

US 2024/0211451 A1   Jun. 27, 2024

Related U.S. Application Data

(63) Continuation of application No. 18/058,568, filed on Nov. 23, 2022, now Pat. No. 11,934,363, which is a (Continued)

(30) Foreign Application Priority Data

Aug. 17, 2020   (GB) ..................... 2012816

(51) Int. Cl.
*G06F 16/21*   (2019.01)
*G06F 16/22*   (2019.01)
(Continued)

(52) U.S. Cl.
CPC .......... *G06F 16/214* (2019.01); *G06F 16/213* (2019.01); *G06F 16/2282* (2019.01); (Continued)

(58) Field of Classification Search
CPC ............. G06F 16/214; G06F 16/24558; G06F 16/2282; G06F 16/244; G06F 16/258; G06F 16/213
See application file for complete search history.

(56) References Cited

U.S. PATENT DOCUMENTS 6,233,578 B1 *  5/2001  Machihara ............ G06F 16/245
6,278,452 B1   8/2001  Huberman et al.
(Continued)

FOREIGN PATENT DOCUMENTS

EP         3958140        2/2022
WO    WO 2019/035903      2/2019

OTHER PUBLICATIONS

Oracle® Database Database Administrator's Guide 12c Release 2 (12.2) E85760-09 (Year: 2020).*
(Continued)

*Primary Examiner* — Kuen S Lu
(74) *Attorney, Agent, or Firm* — Knobbe, Martens, Olson & Bear, LLP

(57) ABSTRACT

A method is provided for output validation of data processing systems, performed by one or more processors. The method comprises performing a data comparison between a first data table and a second data table to determine a data differentiating table, wherein the first data table is based on an output of a first data pipeline, and wherein the second data table is based on an output of a second data pipeline; performing a schema comparison between the first data table and the second data table to determine a schema differentiating table; generating a first output validation score based on the data differentiating table; generating a second output validation score based on the schema differentiating table; and generating a summary comprising both the first and second output validation scores.

20 Claims, 6 Drawing Sheets

Related U.S. Application Data continuation of application No. 17/064,947, filed on Oct. 7, 2020, now Pat. No. 11,550,764.

(51) Int. Cl.
  *G06F 16/242* (2019.01)
  *G06F 16/2455* (2019.01)
  *G06F 16/25* (2019.01)

(52) U.S. Cl.
  CPC ...... *G06F 16/244* (2019.01); *G06F 16/24558* (2019.01); *G06F 16/258* (2019.01)

(56) References Cited

U.S. PATENT DOCUMENTS

| | | | |
|---|---|---|---|
| 8,037,056 | B2 | 10/2011 | Naicken et al. |
| 10,484,326 | B2* | 11/2019 | Norwood ............ H04L 12/66 |
| 11,550,764 | B2 | 1/2023 | Fridman et al. |
| 11,934,363 | B2 | 3/2024 | Fridman et al. |
| 2008/0162509 | A1 | 7/2008 | Becker |
| 2009/0164496 | A1* | 6/2009 | Carnathan ........... G06F 16/2358 707/999.102 |
| 2010/0121813 | A1 | 5/2010 | Cui et al. |
| 2014/0310231 | A1 | 10/2014 | Sampathkumaran et al. |
| 2014/0372374 | A1* | 12/2014 | Bourbonnais ........... G06F 16/27 707/613 |
| 2015/0293968 | A1* | 10/2015 | Dickie ................. G06F 16/244 707/738 |
| 2016/0063214 | A1 | 3/2016 | Blue |
| 2016/0275150 | A1 | 9/2016 | Brurnonnais et al. |
| 2017/0061027 | A1 | 3/2017 | Chesla et al. |
| 2018/0307715 | A1* | 10/2018 | Anand ................... G10L 15/02 |
| 2019/0205429 | A1 | 7/2019 | Lee |
| 2019/0332697 | A1 | 10/2019 | Williams et al. |
| 2019/0377713 | A1 | 12/2019 | Lankford et al. |
| 2020/0133257 | A1* | 4/2020 | Cella ................. G05B 19/4183 |
| 2021/0149896 | A1 | 5/2021 | Yu et al. |
| 2021/0397972 | A1* | 12/2021 | Walters ................. G06N 3/047 |
| 2023/0098701 | A1 | 3/2023 | Fridman et al. |

OTHER PUBLICATIONS

Oracle® Database Data Warehousing Guide 10g Release 1 (10.1) Part No. B10736-01 Dec. 2003 (Year: 2003).*

U.S. Appl. No. 18/058,568, Output Validation of Data Processing Systems, filed Nov. 23, 2022.

OraRep: "Oracle7™ Server Distributed Systems", vol. II: Replicated Data, Release 7.3, primary author: Maria Pratt, Feb. 1996, Oracle® Corporation (1996).

SQLCompTool: IDERA—"SQL Comparison Toolset Version 10.0" (2019).

Official Communication for European Patent Application No. 20200605.2 dated Mar. 25, 2021, 8 pages.

* cited by examiner

| col.seq | columnname | datatype | aggregation_value | file_count | date_time_created | databasename | tablename |
|---|---|---|---|---|---|---|---|
| 5 | gender | string | fddca11d6fb4a02ec667a5e7fbd175b3 | 0 | 2020-04-27T 15:10:37.50 | demo | demo_mock_data |
| 6 | ip_address | string | aa050255fbb96274a537247 4ead8b49b | 0 | 2020-04-27T 15:10:37.50 | demo | demo_mock_data |
| 3 | last_name | string | 438faa37e9756abc44622ec418b515d2 | 0 | 2020-04-27T 15:10:37.50 | demo | demo_mock_data |
| 4 | email | string | 9ff75383c0f8b59a463e83af221df6c9 | 0 | 2020-04-27T 15:10:37.50 | demo | demo_mock_data |
| 1 | id | int | 500500 | 0 | 2020-04-27T 15:10:37.50 | demo | demo_mock_data |
| 2 | first_name | string | 1fab56383d0f8bf9a32e83ab241df1c9 | 0 | 2020-04-27T 15:10:37.50 | demo | demo_mock_data |
| 0 | table_wide | N/A | N/A | 7 | 2020-04-27T 15:10:37.50 | demo | demo_mock_data |

*FIG. 3a*

| left_columnn. | left_datatype | left_aggr_value | left_databasen. | left_tablename |
|---|---|---|---|---|
| ip_address | string | 9ff75383c0f8b59a463e83af221df6c9 | demo | demo_mock_data2 |
| first_name | string | 1fab56383d0f8bf9a32e83ab241df1c9 | demo | demo_mock_data2 |
| last_name | string | 438faa37e9756abc44622ec418b515d2 | demo | demo_mock_data2 |
| table_wide | N/A | N/A | demo | demo_mock_data2 |
| gender | string | fddca11d6fb4a02ec667a5e7fbd175b3 | demo | demo_mock_data2 |
| email | string | f38dd11efe6377ee46073ff3863aee8d | demo | demo_mock_data2 |
| id | int | 500500 | demo | demo_mock_data2 |
| age | int | 42.67 | demo | demo_mock_data2 |

| right_columnn. | right_datatype | right_aggr_value | right_databasen. | right_tablename |
|---|---|---|---|---|
| ip_address | string | 9ff75383c0f8b59a463e83af221df6c9 | demo | demo_mock_data2 |
| first_name | string | 1fab56383d0f8bf9a32e83ab241df1c9 | demo | demo_mock_data2 |
| last_name | string | 438faa37e9756abc44622ec418b515d2 | demo | demo_mock_data2 |
| table_wide | N/A | N/A | demo | demo_mock_data2 |
| gender | string | fddca11d6fb4a02ec667a5e7fbd175b3 | demo | demo_mock_data2 |
| email | string | f38dd11efe6377ee46073ff3863aee8d | demo | demo_mock_data2 |
| id | string | 563fab34bc45987aab23bbb12234fff | demo | demo_mock_data2 |

| join_hit | match_columnn. | match_dt | match_aggr_value | all_match | count_not_match |
|---|---|---|---|---|---|
| true | true | true | true | true | 0 |
| true | true | true | true | true | 0 |
| true | true | true | true | true | 0 |
| true | true | true | true | true | 0 |
| true | true | true | true | true | 0 |
| true | true | true | false | false | 1 |
| false | | | | false | 1 |

*FIG. 3b*

| columnname | left_missing | right_missing | type_mismatch |
|---|---|---|---|
| table_wide | 0 | 0 | 0 |
| gender | 0 | 0 | 0 |
| email | 0 | 0 | 0 |
| first_name | 0 | 0 | 0 |
| first_name | 0 | 0 | 0 |
| id | 0 | 0 | 1 |
| ip_address | 0 | 0 | 0 |
| age | 0 | 1 | |

*FIG. 3c*  270

| validation_criteria | percentage |
|---|---|
| schema_comparison | 56.25 |
| data_comparison | 97.5 |

*FIG. 3d*  300

OUTPUT VALIDATION OF DATA PROCESSING SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

This disclosure relates to an approach for output validation of data processing systems.

BACKGROUND

Cross-validation of outputs of computing systems, for example data analysis systems or data analytics systems, involves many hardware and software issues. Cross-validation is required, for example, when two systems run side by side or when a second system is obtained from a first system by migration. The idea is that a legacy system is (gradually) abandoned and a successor system replaces it and takes over its functionality but performs it more efficiently, for example faster. Although computing devices are able to work with mathematical precision, many technical problems may arise and it cannot be assumed that the successor system is able to perform the functions of the legacy system identically. In a migration from one data analysis system to another, for example from a legacy system to a target system, which involves the processing of large data tables (in the order of gigabytes or more) by using different technology, languages, formats and algorithms to transfer the data to its outputs, it cannot be avoided that data items mismatch, get corrupted, lose accuracy or get lost or that the data schema do not fit. Reasons can be for example incompatibilities relating to hardware (e.g. different architecture, processors, memory) or to the compiler differences between the legacy system and the successor system or also incompatibilities in the data schemas used by the two different systems or different assumptions, specifications or prioritization done in the two different systems.

The question whether a migration has been successful/accurate or not is partly subjective and depends on many factors, last but not least on the individual situation, i.e. the specific use case. While in some cases, a migration may be considered to be successful because less accuracy of migration is required, a same migration accuracy could be considered to be unacceptable in another case. Although migration validation could be performed by direct comparison of a source output table and the migrated output table, this is not always practical, for instance because it would require transmitting a very large source output table over a network, and sometimes is not possible at all. While technical reasons for not being able to transmit the data may rely on network, bandwidth and security issues, there may also regulatory restrictions that prohibit the transmission of data from one system to another. It would also be desirable to have an automatic system that is able to indicate quantitatively whether a migration has been successful or not in the given circumstances, avoiding the need for manual checking and validation, which is often very expensive in time and resources for large datasets.

SUMMARY

A first aspect of the disclosure relates to a computer-implemented method for output validation of data processing systems. The method is performed by one or more processors. The method comprises aggregating at least a portion of a first data table, which is an output of a data pipeline of a first data processing system, into a first aggregated data table; aggregating at least a portion of a second data table, which is an output of a data pipeline of a second data processing system, into a second aggregated data table; the second data processing system being designed to perform essentially a same functionality as the first data processing system; performing a data comparison between the first aggregated data table and the second aggregated data table to obtain a data differentiating table; performing a schema comparison between the first aggregated data table and the second aggregated data table to obtain a schema differentiating table; generating a summary from the data differentiating table and the schema differentiating table; and deriving a value from the summary that indicates a similarity between the output of the data pipeline of the first data processing system and the output of the data pipeline of the second data processing system.

A second aspect of the disclosure relates to a non-transitory computer readable medium comprising instructions that, when executed, cause one or more processors to perform a method for output validation of data processing systems as described under the first aspect.

A third aspect of the disclosure relates to a system for output validation of data processing systems. The system comprises one or more processors and memory storing instructions that, when executed by the one or more processors, cause the system to perform the method as described under the first aspect.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the scope of protection.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiment, in which the principles are utilized, and the accompanying drawings of which:

FIG. 3a shows an exemplary aggregate data table based on column-wise aggregation.

FIG. 3b shows an exemplary data differentiating table according to embodiments of the disclosure.

FIG. 3c shows an exemplary schema differentiating table according to embodiments of the disclosure.

FIG. 3*d* illustrates a data differentiating summary table according to embodiments of the disclosure.

Figure 1:
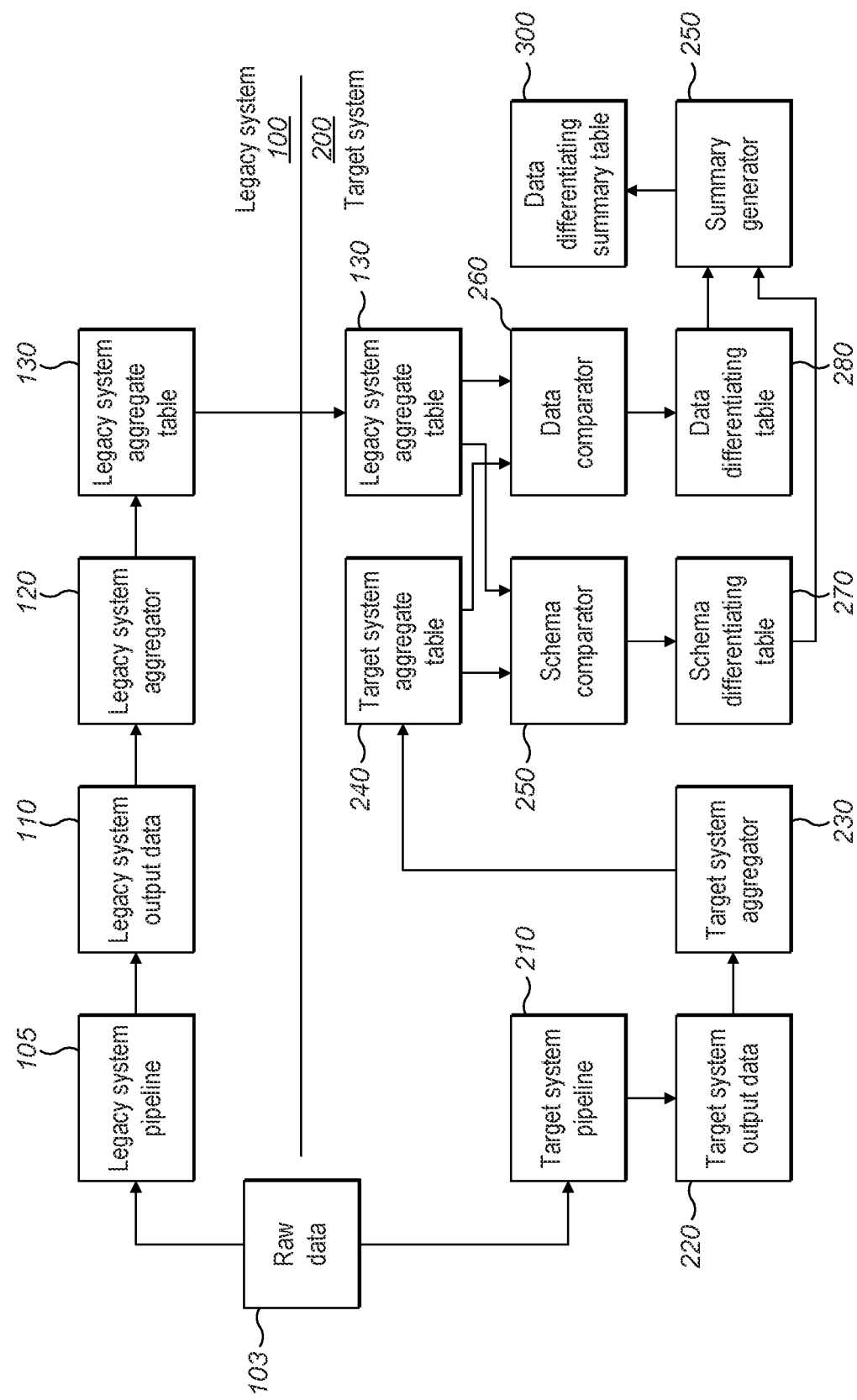
FIG. 1 illustrates a block diagram of an example of a system for performing an output validation of two data processing systems, according to embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

FIG. 1 shows a block diagram in which embodiments of the disclosure may be performed. Before proceeding further with a detailed description of the drawings a few items will be explained.

For a migration of a first data analysis system into a second data analysis system, the data pipelines of the first data analysis system have to be migrated into the second data analysis system which yields results of data pipelines in the first data analysis system and the second data analysis system. Then, a way has to be found to validate whether the results of the first data analysis system match to those of the second data analysis system to ensure that the second data analysis system has essentially the same functionality as the first data analysis system and is able to replace the first one, but in some of the embodiments the two systems may also co-exist and offer resilience or a highly available solution for critical systems. Often, a transfer and consumption of large results datasets into the second data analysis system to perform a comparison (e.g. row by row of an entire dataset) is technically not possible. Manual eye comparison is also not feasible due to the sizes of the data tables to be compared (e.g. billions of records). In many instances it is not possible (and not necessary because of the given situation) that both systems yield exactly the same results—this may be due to differences in hardware, e.g. different processors, compilers, etc., and some margins or different threshold is accessible as essentially similar outcome.

A solution to this problem may be, for example, to perform a column-wise or row-wise aggregation on the output data of the first data analysis system and the output data of the second data analysis system. For example, each column can be aggregated with general known functions, such as sum, average, median, standard deviation, minimum, maximum, variance, kurtosis for numerical values. Hash values, for example a digest such as MD5, or total string length or "histogram" of characters in a string value (e.g. how many 'a', how many 'b', etc.), or a prefix length match can be used for concatenated strings. Histograms may be used for categorical data. The aggregation leads to a massive compression and the result is "one" data item per column or row. It should be mentioned that aggregation of rows is more complicated as they are built from columns of different types, and one instance/value per column. Aggregation of rows is important for example in machine learning where one has for example 300 columns all of which are numerical values between 0.0 and 1.0 that represent normalized weights. All of those 300 values can be aggregated to a single one. In most parts, aggregation is done per column since it leads to a massive compression (e.g. 1 Billion rows column of salary into 6 numbers of minimum, maximum, median, standard deviation, average, variance).

Another reason why aggregation of rows is important is pivot tables when values become columns. Hence, this leads to a high number of columns. For example, a summary of some date invoices for 10 years which becomes a daily column leading to 365*10 columns. In a next step, a data comparison is performed on an aggregated data table of the first data analysis system and an aggregated data table of the second data analysis system. The result of this operation is to obtain a data differentiating table which indicates the differences between the two tables on a data level. In addition, a schema comparison is performed on the first aggregated data table and the second aggregated data table to obtain a schema differentiating table. This table indicates how the two tables differ on a schema level. A summary is generated from the data differentiating table and the schema differentiating table. Finally, a (score) value is calculated from the summary that gives a user an indication how accurate the migration has been performed. For example, a score value close to "1" indicates that the migration has been performed almost perfectly with hardly any losses, i.e. that the second data analysis system does exactly the same as the first. Embodiments of this specification provide a harmonized comparison of data and schema and also allows a user to give weight(s) to parts of the data to be compared, i.e. giving emphasis to certain rows or columns and ignoring others. Depending on the use case, a very high identity of the output data of the first data analysis system and the second data analysis system is required, while in other instances, less precision is enough to consider a migration successful. Embodiments of this specification allow to compare large datasets without the necessity to co-locate the datasets and compare all the data in those line by line.

Returning now to the schematic overview of FIG. 1, which shows an embodiment of the disclosure based on an exemplary migration between legacy system 100 and target system 200. However, before proceeding further with the description of FIG. 1, a few items will be discussed.

Some of the embodiments refer to a computer-implemented method for output validation of data processing systems. The method is performed by one or more processors. The method comprises aggregating at least a portion of a first data table, which is an output of a data pipeline of a first data processing system, into a first aggregated data table. Then, at least a portion of a second data table is aggregated, which is an output of a data pipeline of a second data processing system, into a second aggregated data table. The second data processing system may be a successor system of the first data processing system and is designed to perform essentially a same functionality as the first data processing system. Subsequently, a data comparison is performed between the first aggregated data table and the second aggregated data table to obtain a data differentiating table. A schema comparison is performed between the first aggregated data table and the second aggregated data table to obtain a schema differentiating table. A summary is generated from the data differentiating table and the schema differentiating table and a value is derived from the summary that indicates a similarity between the output of the data pipeline of the first data processing system and the output of the data pipeline of the second data processing system.

Performing aggregation on the first data table and the second data table is comparable to calculating a fingerprint of both data tables and allows to efficiently compare the two tables without having to compare each data item individually. Calculating a fingerprint is a procedure that maps an arbitrarily large data item to a much shorter bit string that uniquely identifies the original data for all practical purposes just as human fingerprints uniquely identify people. Fingerprints are typically used to avoid the comparison and transmission of bulky datasets.

In some of the embodiments, the first and second data processing systems are database management systems or data analysis systems that process raw data to gain more insightful data. In some of the embodiments, such more insightful data are obtained by enrichment, aggregation and transformation which require a large amount of computational resources. In some of the embodiments, the data analysis systems are ITL systems. In some of the embodiments, the data processing systems may be data analytics systems. Data analytics is the discovery, interpretation, and communication of meaningful patterns in data. While data analysis is focused on understanding the past, data analytics is on the future and aims at providing a basis for effective decision making.

In some of the embodiments, the first aggregated data table is transferred to the second data processing system where the data comparison and subsequent steps (schema comparison, generating summary form and deriving a value) of the method are performed.

In an alternative embodiment, the first aggregated data table and the second aggregated data table are transferred to a third system where the data comparison and the subsequent steps of the method are performed.

In some of the embodiments, data comparison is performed by defining an interval such that two numeric values are considered to be equal if their difference is smaller than a threshold value. In other embodiments, two numeric values are considered to be equal if their rounded value to a certain digit is the same. In yet other embodiments, two floats or double values are considered to be equal although their accuracy is different. As regards text data, two text data are considered to be equal if they have the same frequency of unique words. In other embodiments, case sensitivity is used to determine whether two texts are equal. In yet other embodiments, spaces and tabs can be removed before fields are used to determine whether two texts are equal. In yet other embodiments, umlauts or special language markings are ignored before making a comparison. In yet other embodiments, two date and time indications are considered to be equal although their formats are different, they may even be identified in different calendar types. In yet other embodiments, categorical values may be mapped from strings to numbers or vice versa, language translated, and unique comparators may yield equal for different values (e.g. a colour comparator may be satisfied with purple to equal magenta). In some of the embodiments two-character strings of different lengths are considered to be equal if one string is the prefix of another. For example, "Src=Catalo" will match "Src=Catalog", although their hash values will be different, e.g. when one of the systems imposes length restrictions on the column (10 in this sample for the first item).

In some of the embodiments, the aggregating the first data table and the aggregating the second data table are performed column-wise or row-wise to obtain one data element per column and row, respectively.

In some of the embodiments, the schema comparison is based on a comparison of types and/or names of one or more columns of the first aggregated data table and the second aggregated data table. In some of the embodiments, a Boolean value in the schema comparison indicates whether the name of a column is present in the first aggregate table but not in the second aggregate table and vice versa. In some of the embodiments, the schema comparison may take into account whether the data is optional or required data. In other embodiments, the schema comparison takes into account null comparison. For example, empty value, null, N/A may all be considered to be equal. For example, in some of the embodiments, 0000-00-00 is a null value for a data field that should match an empty field. In yet other embodiments, the schema comparison allows to define whether the order of the column is significant or not. This may be critical in transformation that take a column by place (e.g. first column) instead of by name. In yet other embodiments, schema comparison takes into account the size, e.g. for text column its maximum size. In yet other embodiments, nullability is taken into account. The nullability of a field indicates whether nulls are allowed in this field or not. In some cases, there must be a match (e.g. null in primary key fields are a problem, even if the primary key field itself is meaningless to the use case and will get low weight for the score calculation, otherwise).

In some of the embodiments, the data comparison is based on a comparison of values of fields of one or more columns of the first aggregated data table and the second aggregated data table. In some of the embodiments, a Boolean value in the data comparison indicates whether a corresponding value in the first aggregate table and the second aggregate table is the same. A Boolean value "True" indicates that the two values are the same, a Boolean value "False" indicates that they are not the same.

In some of the embodiments, the generating the summary comprises using weights to obtain a use case aware summary.

In some of the embodiments, a user can determine how columns and/or rows are to be weighted. This allows a user to influence the result of the method since s/he is able to indicate which columns are of higher importance than others in the migration process. In some of the embodiments, the user is enabled to ignore individual columns. In some of the embodiments, this is done by assigning the weight zero to individual columns. For example, some description local values may have different lengths and hence be truncated to one which means that a hash value will not be equal, but the values are actually 100% equal. Since it may not even be a valuable field for any decision based on the outcome, it may make sense to ignore these values (by assigning the weight zero).

In some of the embodiments, the user does not have to input weights for columns and/or rows, but the weights of columns and/or rows are automatically determined based on user interaction with one or more graphical user interfaces, such as dashboards. In some of the embodiments, the system will determine which columns are consumed by users, viewed, or interacted with—or otherwise influence the user decisions based on the outputs and which are not. Those that influence more decisions and/or appear in more reports or derived data from the outputs are assigned higher weights.

In some of the embodiments, the aggregating the first data table and the second data table are performed by using at least one of the functions sum, average, median, maximum, minimum, variance, kurtosis and standard deviation for numeric values.

In some of the embodiments, the aggregating the first data table and the second data table are performed by using a hash value for concatenated string columns. A hash function is a function that is used to map data of arbitrary size to fixed-size values.

In some of the embodiments, the aggregating the first data table and the second data are performed by calculating hash values for numeric values.

In some of the embodiments, the aggregating the first data table and the second data table are performed using a histogram of characters in a string value.

In some of the embodiments, a portion of the first aggregated data table and a portion of the second aggregated data table are used for tracking of the data validation.

Some of the embodiments relate to a non-transitory computer readable medium comprising instructions that, when executed, cause one or more processors to perform a method for output validation of data processing systems. The method comprises aggregating at least a portion of a first data table, which is an output of a data pipeline of a first data processing system, into a first aggregated data table; aggregating at least a portion of a second data table, which is an output of a data pipeline of a second data processing system, into a second aggregated table; the second data processing system being designed to perform a same functionality as the first data analysis system; performing a data comparison between the first aggregated data table and the second aggregated data table to obtain a data differentiating table; performing a schema comparison between the first aggregated data table and the second aggregated data table to obtain a schema differentiating table; generating a summary from the data differentiating table and the schema differentiating table; and deriving a value from the summary that indicates a similarity between the output of the data pipeline of the first data processing system and the output of the data pipeline of the second data processing system.

Some of the embodiments relate to a system for output validation of data processing systems. The system comprises one or more processors and memory storing instructions that, when executed by the one or more processors, cause the system to perform aggregating at least a portion of a first data table, which is an output of a data pipeline of a first data processing system, into a first aggregated data table; aggregating at least a portion of a second data table, which is an output of a data pipeline of a second data processing system, into a second aggregated table; the second data processing system being designed to perform a same functionality as the first data analysis system; performing a data comparison between the first aggregated data table and the second aggregated data table to obtain a data differentiating table; performing a schema comparison between the first aggregated data table and the second aggregated data table to obtain a schema differentiating table; generating a summary from the data differentiating table and the schema differentiating table; and deriving a value from the summary that indicates a similarity between the output of the data pipeline of the first data processing system and the output of the data pipeline of the second data processing system.

Returning now to FIG. 1 which shows a schematic illustration of an embodiment of the disclosure based on a migration from a legacy system 100 into a target system 200. A person skilled in the art would readily understand that the concept may be performed on any database management system, data analysis systems or data analytics systems. Since the target system 200 offers more efficient data processing than the legacy system 100, in particular data analysis and data analytics possibilities (enrichment, aggregation, transformation, etc.) to gain more insightful data, the idea is that the target system 200 should replace the legacy system 100 which were to become a legacy system and finally be shutdown. To this end, a quality metric (score value) is devised that indicated that the functions performed by legacy system 100 were performed in a similar way in the target system 200.

A legacy system data pipeline 105 is depicted which has access to raw data 103 and processes it into more insightful data and ends in the legacy system output data 110 as the result of the legacy system data pipeline 105. The legacy system output data 110 are data destined for a database and a reference table in the target system 200 maps those legacy system databases to feeds of the target system. Normally, an owner of such insightful data does not want to transfer this data to other systems since they may be used for decision making. Often the data tables, sometimes billions of rows, are too large to be transferred to another system for comparison as it is the case in the illustrated example where the legacy system output data 110 cannot be ingested into the target system 200 for direct comparison. Instead, the legacy system output data 110 is aggregated by a legacy system aggregator 120 which yields a legacy system aggregate table 130.

Aggregation

The legacy system aggregator 120, which may be implemented as a script (computer language with a series of commands within a file that is capable of being executed without being compiled) such as Python, which is common nowadays, or Perl or PHP which have become less common, is configured to perform one or more aggregation functions on the legacy system output data 110 such as performing a sum function on the rows or columns to reduce the size of the legacy system output data 110. The legacy system aggregate table 130 has the function of a fingerprint of the legacy system output data 110 and is much smaller in size. Then, the legacy system aggregate table 130 is ingested into the target system 200. The legacy system aggregate table 130 is an aggregated dataset of the database that includes a feed for the legacy system data pipeline 105.

At 210, a target system data pipeline 210 is shown which has access to the raw data 103 and yields as a result target system output data 220 which is a result of a migrated built data pipeline and is subsequently input into a target system aggregator 230 that applies an aggregator function, such as sum, etc. on the target system output data 220 to yield a target system aggregate table 240 that is much smaller in size than the target system output data 220. The legacy system data pipeline 105 and the target system data pipeline 210 have both access to the same raw data 103. They both ingest the raw data 103 into their systems which may be different regarding data schema, processing etc. To validate that a pipeline was migrated from A to B one has to (i) validate equal inputs and (ii) validate that resulting outputs are the same. Without (i), one can get to the same result but pipelines will be completely different. For example, if input to system A input is 10, a pipeline adds "1", the result would be "11". If a system B gets an input of "22", the pipeline divides by "2", the result would also be "11". Obviously, the pipeline was not migrated well, even if the result is the same.

The comparisons between the legacy system output data 110 and the target system output data 220 are performed through the target system aggregate table 240 and the legacy system aggregate table 130. It should be mentioned that the legacy system output data 110 and the target system output data 220 may be large data tables with terabytes of data. The problem would be to materialize the legacy system output data 110 (e.g. to have it complete) and/or transfer the legacy system output data 110 to either the target system 200 or a third system that will compare the legacy system output data 110 with the target system output data 220. Hence, the method does not compare the output data row by row but instead aggregates the datasets from the target system 200 and compares them against the aggregated datasets from the legacy system 100. The aggregate tables 130, 240 have both column-wide data and table-wide data for any specific dataset, e.g. the sum of a column, total number of rows in the table etc. A table schema for an aggregate table 130, 240 and an exemplary aggregated table 130, 240 will be explained with reference to FIG. 3a.

Aggregating the legacy system output data 110 and the target system output data 220 leads to a data reduction, which means that for example a terabyte of data may become 1 kilobyte, and an aggregation policy dictates how to perform this reduction. For example, each column can be aggregated with generally known functions, such as sum, average, median, maximum, minimum, kurtosis, variance and standard deviation. A summation or calculation of an average value or a calculation of a standard deviation may be applied for numerical values. In some of the embodiments, hash values are used for (concatenated) string values. For example, MD5 may be used to generate a hash value. In some of the embodiments, histogram values are used for categorical data (i.e. data that may be divided into groups). Moreover, in other embodiments, minimum and maximum values are used for aggregating numerical values. In yet other embodiments, string values may be aggregated by calculating the total string length. A histogram of characters may be used to aggregate characters in a string. A "histogram" of characters indicates for each character how often it appears in a string, i.e. how many 'a' appear in a string, how many 'b', how many 'c', etc. Once the columns have been aggregated as explained above, the result will be one data item per column regardless of the number of rows.

Comparison

A schema comparator 250, implemented for example as a script, performs a schema comparison between the target system aggregate table 240 and the legacy system aggregate table 130. The result, which represents the schema comparison of the two aggregate tables 130, 240, will be stored in one or more tables, referred to as schema differentiating table 270, which will be explained in more detail at FIG. 3c.

Subsequently of concurrently to an operation of the schema comparator 250, a data comparator 260, implemented as a script, performs a data comparison between the target system aggregate table 240 and the legacy system aggregate table 130. The result, which represents the data comparison of the two aggregate tables 130, 240 will be stored in one or more tables, referred to as data differentiating table 280, which will be explained in more detail with reference to FIG. 3b.

Summary

Once the schema differentiating table 270 and the data differentiating table 280 have been obtained, they are both input to a summary generator 290 which outputs a data differentiating summary table 300 that contains one or more output validation scores. An example of data differentiating summary table 300 is shown in FIG. 3d which shows two output validation scores, one relating to schema comparison and one relating to data comparison.

The score it gives is such that all matches are equally weighted. A formula for the output validation score is number_of_mismatches/number_of_possible_mismatches.

An output validation score can be computed by the following formula:

$$\text{Score} = \frac{\sum_{col} W_i * \text{Diff}_i}{\sum_{col} W_i} + \frac{\sum_{col} W_i^{schema} * \text{Diff}_i^{schema}}{\sum_{col} W_i^{schema}}$$

This formula is a sample summation based on weighted average. In some cases, the values need to be normalized as different columns will have different value ranges. For example, if there is "years of experience" and "IQ", a difference of "1" in each is not equal (e.g. IQ 120 or 121 vs. years of experience 2 or 3)—the former may not be important, while the latter is.

In this formula, w weight is assigned to schema comparison Wi(schema) (e.g. on column name, types, ability to have nulls etc. format) and weights to each column aggregation Wi and a weighted average score of the weight and the result of each comparison is done.

The calculation may be performed in two approaches. In a first approach, the weighted average of data difference and the weighted average of schema difference are calculated. Then, these values are used in another formula to derive the overall difference (e.g. again weighted difference of both). In a second approach, single weighted average of all differences of each column and each schema are calculated. Both approaches may lead to the same results. The difference is that the first approach allows to present to the user two numbers as the "data" migration and "schema" migration before blending them, while the second approach blends them from the outset.

The weights allow to "de-rank" importance in mismatch of description fields or numeric fields of no consequence to the user of that data while emphasizing columns whose values are essential for the user. If the legacy system aggregate table 130 is 100% a same as the target system aggregate table 240, the legacy system output data 110 and the target system output data 220 are 100% a same and no false positive exist. When it is not the same, the aim is to be indicative of the "breadth" of inaccuracy in a proportional way.

Figure 2:
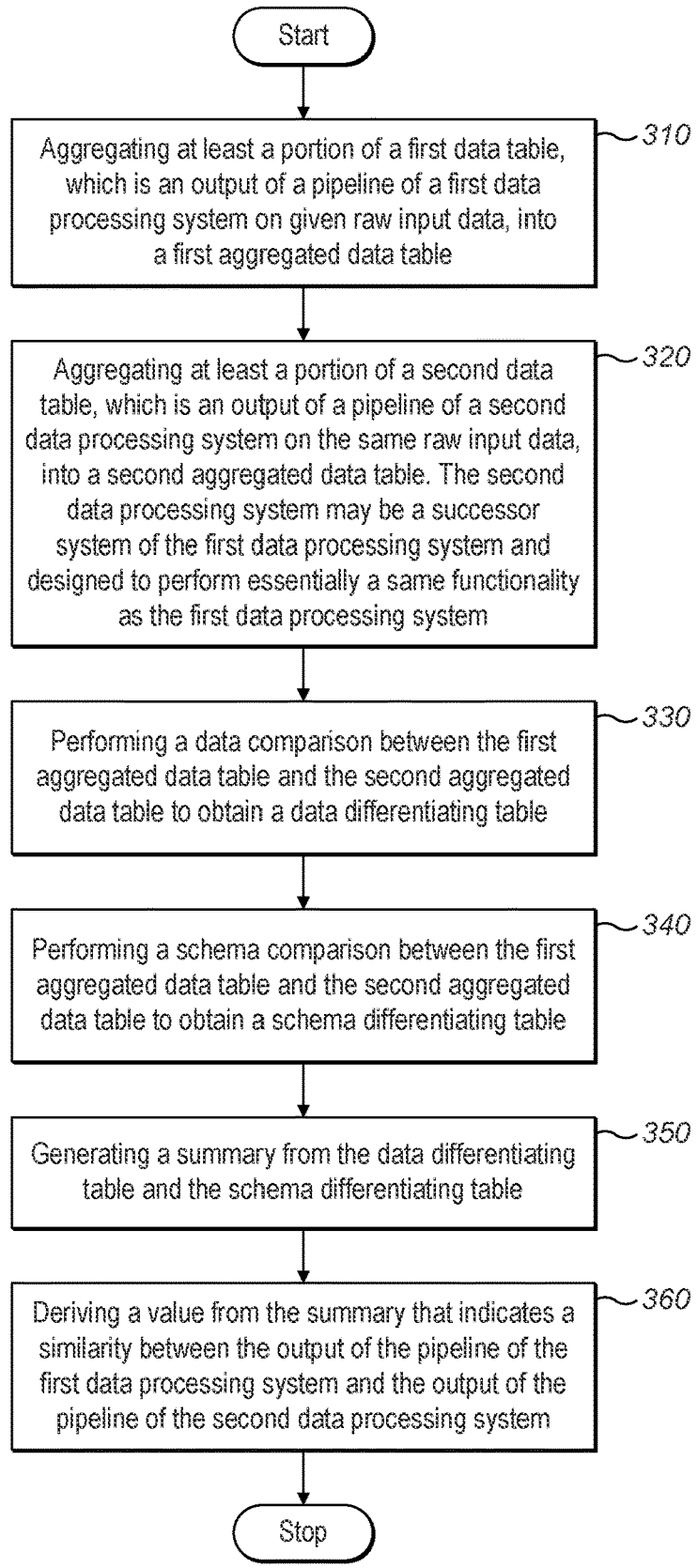
FIG. 2 illustrates a flowchart of an example method for performing an output validation of two data processing systems.

FIG. 2 shows a flowchart which illustrates the steps of a method for performing output validation of two data processing systems. At 310, at least a portion of a first data table, which is an output of a data pipeline of a first data processing system on given raw input data, is aggregated into a first aggregated data table. At 320, at least a portion of a second data table, which is an output of a data pipeline of a second data processing system on the same raw input data, is aggregated into a second aggregated data table. The second data processing system may be a successor system of the first data processing system and is designed to perform essentially a same functionality as the first data processing system. At 330, a data comparison between the first aggregated data table and the second aggregated data table is performed to obtain a data differentiating table. At 340, a schema comparison between the first aggregated data table and the second aggregated data table is performed to obtain a schema differentiating table. At 350, a summary from the data differentiating table and the schema differentiating table is generated. At 360, a score value is derived from the summary that indicates a similarity between the output of the first data processing system and the output of the data pipeline of the second data processing system.

FIG. 3a shows an exemplary aggregate data table 130 from the legacy system 100 which has the following data table schema. This aggregate data table 130 has been obtained from an original data table, which relates to notional personal data such as gender, IP address, first name, last name, age, etc., by column-wise aggregation which means that each column in the original data table is reflected by one row in the aggregate data table 130. The first column of table 130 col_seq indicates the sequence number of columns in the original data table. The second column columname in aggregate table 130 indicates the columname. In the shown example, the columnnames are "gender", "ip_address", "last_name", "email", "id", "first_name" and "table_wide" (which does not correspond to a column and it has values that are across all columns, hence datatype equals "non applicable"). The third column indicates the datatype that is used in the corresponding column. In the columns 5, 6, 3, 4 and 2 datatype "string" is used, while in column with sequence number 1, "integer" is used as datatype. In column with sequence number 0, no datatype is applicable. In the fourth column of the aggregate data table an aggregation_value for each column is indicated. In the example shown, a hash value is calculated for each of the columns that have "string" as datatype, which are columns 5, 6, 3, 4 and 2. For example, a hash value is calculated for the concatenation of all last names, all e-mail addresses, etc. of one column of the original data table. The column with sequence number 1 refers to an "id" value which is an integer value and the sum of all id values yields the value 500500. The fifth column of the aggregate data table 130 indicates file_count of the original database. All columns, except the column with sequence number 0, have a file_count of zero, while the column with sequence number 0 has file_count of 7. The sixth column date_time_created of the aggregated table 130 indicates the datetime at which the aggregation has been created. This indication may be used for assuring that aggregations are done on the same version of the original data table. It should be mentioned that some of the columns (e.g. date_time_created, databasename, tablename, etc.) are used for the management and/or tracking of comparison and the repetition of comparison (e.g. running multiple times the pipeline in the target system 200 and comparing again and again to yield a trend of migration accuracy improvement). These management columns have the capability of tracking output validation over time ("recurring validation"). This refers to the ability to manage multiple running of the pipeline 210 of the target system 200 and evaluate how the migration improves over time with respect to more accurate outputs from the target system. It is noted that the content of management columns is not part of the core "comparison" and these columns are typically not obtained by aggregation. The seventh column databasename indicates the name of the original database. In the present example, all datasets come from a database called "demo". The eighth column of the aggregate data table indicates tablename which is the name of the original data table. In the example, all data is taken from a table called "demo_mock_data". The aggregate data table 130 shown in the example could have two additional columns which are not shown in this figure. A column_filePath indicates the path in the target system 200/legacy system 100 for that dataset and a column_imported At indicates the time when an ingest took place for an aggregate table. While this aggregate table 130 shows an aggregate table for the legacy system 100, a similar aggregated table 240 is defined for aggregate tables that are made from target system output data 220.

FIG. 3b illustrates an example of a data differentiating table 280 having 16 columns (that are presented in three parts) which has the following schema. The first five columns are columns relating to an aggregate data table 130 of the legacy system 100. (In addition to the table shown in FIG. 3a, it contains a column "age" with an aggregation value (i.e. average value) of 42.67 years.) It contains the columns left_columnname (value of the columnname field in the legacy system, aggregate table 130), left_datatype (value of the datatype field in the legacy system aggregate table 130), left_aggr_value (value of the aggregation_value field in the legacy system aggregate table 130), left_databasename (value of the databasename field in the legacy system aggregate table 130), left_tablename (value of the tablename field in the legacy system aggregate table 130).

The next five columns are columns relating to an aggregate data table 240 of the target system 200. They contain the columns right_columnname (value of the columnname field in the target system aggregate table 130), right_datatype (value of the datatype field in the target system aggregate table 130), right_aggr_value (value of the aggregation_value field in the target system aggregate table 130), right_databasename (value of the databasename field in the target system aggregate table 130), and right_tablename (value of the tablename field in the target system aggregate table 130).

The next column join_hit indicates whether a column has been found in the original tables. While the value is "True" for the first seven rows of this column, it is "False" for the eighth row, since the column "age" in line 8 can only be found in the database of the legacy system 100 but not in the database of the target system 200.

The subsequent three columns indicate by means of Boolean values whether the corresponding values are the same. They contain match_columnname (Boolean value, a "True" indicates that the columnname has the same value in both aggregate tables 130, 240), match_datatype (Boolean value, a "True" indicates that the datatype has the same value in both aggregate tables 130, 240), match_aggr_value (Boolean value, a "True" indicates that the aggregation values are the same in both aggregate tables 130, 240).

The next column all_match is a Boolean value. A "True" indicates that all the portions have the same values in both aggregate tables 130, 240. Since this is the case in the present example, the value in this column is always "True" except for the column "age" which does not exist in the database of the target system 200 and for the column "id" which is in the legacy system 100 an integer value and in the target system 200 a string value, hence a type mismatch. The subsequent column count_not_match is a numerical value which indicates how many properties do not match for that specific column. In the first seven rows, the value is "0" which indicates that everything matches in these rows. As one can see, in the penultimate row, the aggregation value does not match due to a type mismatch and in the last row, the join_hit value is "False" since "age" only exists in one database which leads to a count_not_match value of "1" in the last two rows.

It should be mentioned that there are some ignored fields which do not appear in the data differentiating table 280: date_time_created (a field which may optionally be used to check that the right versions of tables are being compared), col_seq (the column sequence is being ignored by default) and file_count (due to the ingestion and migration process, these values will almost always be different between the legacy system 100 and the target system 200 and are therefore ignored).

FIG. 3c shows a schema differentiating table 270 having four columns. The first column columname indicates the name of each column in the original data table. The second column left_missing is a binary field in which a 1 indicates that this column is missing in the legacy system output data 110 but not in the target system output data 220. In the example shown, all columns can be found in the legacy system output data 110 and the target system output data 220, which is indicated by the "0" in all rows. The third column right_missing is again a binary field, in which a "1" indicates that this column is missing in the target system output data 220 but not in the legacy system output data 110. The zero in all rows except the last one ("age") indicates that all columns except the column "age" can be found in the target system output data 220. The fourth column type_mismatch is a binary field in which "1" indicates that this column ("id") has been found in both the original datasets but there is a type mismatch. In the legacy system 100, "id" is an integer value, while it is a string in the target system 200.

FIG. 3d shows a data differentiating summary table 300. The first column indicates the validation criteria and indicates to which of the two validation stages the score applies to. The first line refers to schema_comparison, while the second line refers to data_comparison. The percentage value of the schema_comparison is 56.25% and the percentage value of the data_comparison is 97.5%.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field-programmable gate arrays (FPGAs) that are persistently programmed to perform the techniques, or may include one or more hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating system. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
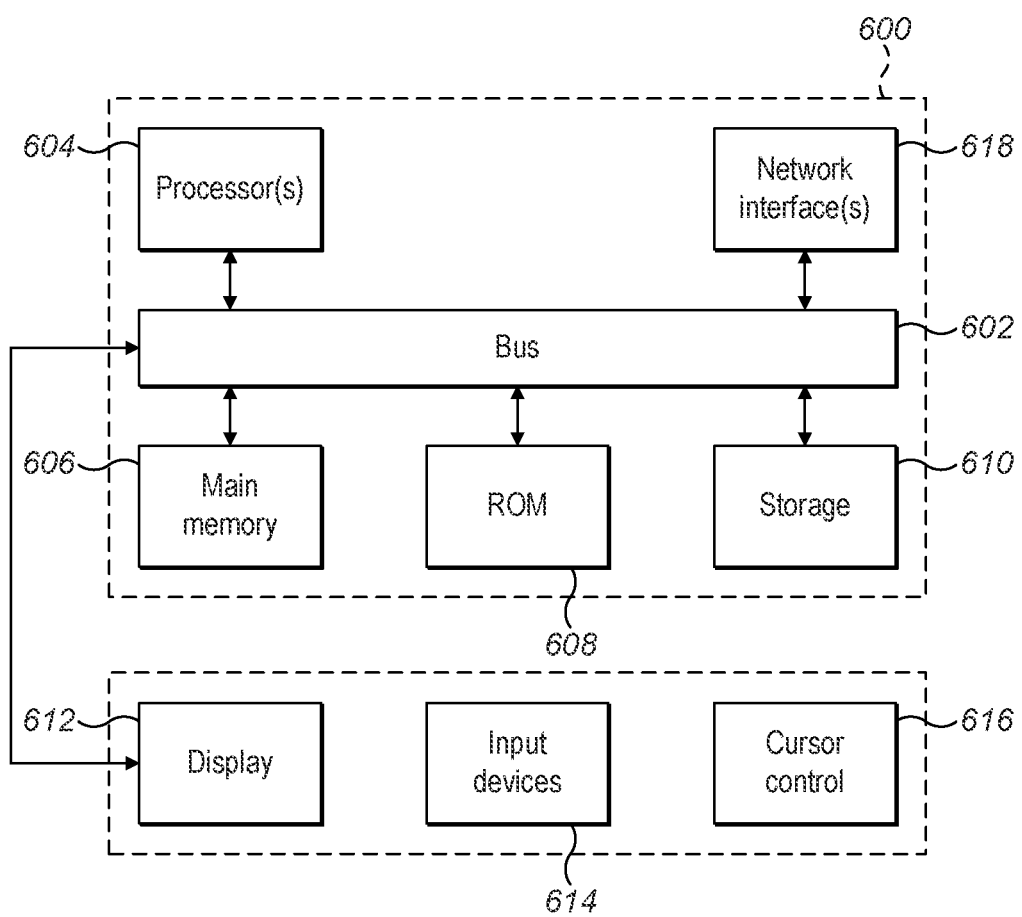
FIG. 4 is a block diagram that illustrates a computer system upon which any of the embodiments described herein may be implemented.

FIG. 4 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operation specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as mouse, a trackball, or cursor directions keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, a same direction information and command selections as cursor control may be implemented via receiving touches on a touch screen without a cursor.

The computer system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module" as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM.

It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASIC or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media" and similar terms, as used herein refers to any media that store data and/or instructions that cause a machine to operate in specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical storage medium, any physical medium with patterns of holes, a RAM, a PROM, and EPROM, a FLASH-EPROM, NVRAM, any other memory chip or cartridge, and networked versions of a same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involves in carrying one or more sequences of one or more instructions to processor 604 for execution. For example, the instructions can initially be carried on a magnetic disk or solid state drive of a remote computer. The remote computer may load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signal that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combine in various ways. All possible combination and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can", "could", "might", or "may" unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in a way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modification may be made to the above-describe embodiments, the elements of which are to be understood as being among other acceptable examples. All such modifications and variations are intended to be included herein within the scope of this disclosure. The foregoing description details certain embodiments of the disclosure. It will be appreciated, however, that no matter how detailed the foregoing appears in text, the concept can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated. The scope of the protection should therefore be construed in accordance with the appended claims and equivalents thereof.

What is claimed is:

1. A computer-implemented method comprising:
   generating a first aggregated data table based on an output of a first data pipeline, wherein generating the first aggregated data table includes performing aggregations on the output of the first data pipeline to determine aggregation values, wherein performing aggregations on the output of the first data pipeline includes calculating first hash values for respective columns or rows of the output of the first data pipeline, and wherein the aggregation values of the first aggregated data table include the calculated first hash values;
   generating a second aggregated data table based on an output of a second data pipeline, wherein generating the second aggregated data table performing aggregations on the output of the second data pipeline to determine aggregation values, wherein performing aggregations on the output of the second data pipeline includes calculating second hash values for respective columns or rows of the output of the second data pipeline, and wherein the aggregation values of the second aggregated data table include the calculated second hash values;
   performing a data comparison between the first aggregated data table and the second aggregated data table to determine a data differentiating table, wherein the data comparison includes comparing respective pairs of the calculated first hash values and the calculated second hash values;
   performing a schema comparison between the first aggregated data table and the second aggregated data table to determine a schema differentiating table;
   generating a first output validation score based on the data differentiating table;
   generating a second output validation score based on the schema differentiating table; and
   generating a summary comprising both the first and second output validation scores.

2. The computer-implemented method of claim 1, wherein the first and second aggregated data tables comprise aggregations of the outputs of the respective first and second data pipelines.

3. The computer-implemented method of claim 1, wherein the aggregation values of the first and second aggregated data tables are determined by at least one of: summing, averaging, determining a median, determining a minimum, determining a maximum, determining a variance, determining a kurtosis, determining a standard deviation for numeric values, calculating a hash value for concatenated string values, calculating hash values for numeric values, or using a histogram of characters in a string value.

4. The computer-implemented method of claim 1, wherein the first and second aggregated data tables include aggregation values in each of the rows of the first and second aggregated data tables, and wherein generating the first and second aggregated data tables includes performing aggregations column-wise or row-wise on the outputs of the respective first and second data pipelines to obtain one aggregation value per column or row, respectively, of the outputs of the respective first and second data pipelines.

5. The computer-implemented method of claim 1, wherein the data differentiating table includes indications of, for each of the columns of the first and second aggregated data tables, a plurality of data comparison characteristics.

6. The computer-implemented method of claim 1, wherein the schema differentiating table includes indications of, for each of the columns of the first and second aggregated data tables, a plurality of schema comparison characteristics.

7. The computer-implemented method of claim 1, wherein the first data pipeline is a legacy data pipeline and the second data pipeline is a target data pipeline that is intended to replace the first data pipeline, and wherein the first aggregated data table is transferred to a second data processing system associated with the second data pipeline, and wherein the data comparison and the schema comparison are performed at the second data processing system.

8. The computer-implemented method of claim 1, wherein the schema differentiating table includes indications of at least: names of each column in the first aggregated data table, any columns present in the first aggregated data table but not in the second aggregated data table, and any columns with a type mismatch between the first and second aggregated data tables.

9. The computer-implemented method of claim 8, wherein the schema comparison is based on a comparison of datatypes and/or names of one or more columns of the first aggregated data table and the second aggregated data table.

10. The computer-implemented method of claim 1, wherein the generating the summary comprises using weights to obtain a use case aware summary, and wherein the summary indicates a similarity between the output of the first data pipeline and the output of the second data pipeline.

11. The computer-implemented method of claim 10, wherein at least one of: a user can determine how columns and/or rows are to be weighted; or weights of columns and/or rows are automatically determined based on user input in one or more dashboards.

12. The computer-implemented method of claim 1 further comprising:
   causing display of the summary as a summary table.

13. A system comprising one or more processors and memory storing instructions that, when executed by the one or more processors, cause the system to:
generate a first aggregated data table based on an output of a first data pipeline, wherein generating the first aggregated data table includes performing aggregations on the output of the first data pipeline to determine aggregation values, wherein performing aggregations on the output of the first data pipeline includes calculating first hash values for respective columns or rows of the output of the first data pipeline, and wherein the aggregation values of the first aggregated data table include the calculated first hash values;
generate a second aggregated data table based on an output of a second data pipeline, wherein generating the second aggregated data table performing aggregations on the output of the second data pipeline to determine aggregation values, wherein performing aggregations on the output of the second data pipeline includes calculating second hash values for respective columns or rows of the output of the second data pipeline, and wherein the aggregation values of the second aggregated data table include the calculated second hash values;
perform a data comparison between the first aggregated data table and the second aggregated data table to determine a data differentiating table, wherein the data comparison includes comparing respective pairs of the calculated first hash values and the calculated second hash values;
perform a schema comparison between the first aggregated data table and the second aggregated data table to determine a schema differentiating table;
generate a first output validation score based on the data differentiating table;
generate a second output validation score based on the schema differentiating table; and
generate a summary comprising both the first and second output validation scores.

14. The system of claim 13, wherein the first and second aggregated data tables comprise aggregations of the outputs of the respective first and second data pipelines.

15. The system of claim 13, wherein the aggregation values of the first and second aggregated data tables are determined by at least one of: summing, averaging, determining a median, determining a minimum, determining a maximum, determining a variance, determining a kurtosis, determining a standard deviation for numeric values, calculating a hash value for concatenated string values, calculating hash values for numeric values, or using a histogram of characters in a string value.

16. The system of claim 13, wherein the first and second aggregated data tables include aggregation values in each of the rows of the first and second aggregated data tables, and wherein generating the first and second aggregated data tables includes performing aggregations column-wise or row-wise on the outputs of the respective first and second data pipelines to obtain one aggregation value per column or row, respectively, of the outputs of the respective first and second data pipelines.

17. The system of claim 13, wherein the data differentiating table includes indications of, for each of the columns of the first and second aggregated data tables, a plurality of data comparison characteristics.

18. The system of claim 13, wherein the schema differentiating table includes indications of, for each of the columns of the first and second aggregated data tables, a plurality of schema comparison characteristics.

19. The system of claim 13, wherein the first data pipeline is a legacy data pipeline and the second data pipeline is a target data pipeline that is intended to replace the first data pipeline, and wherein the first aggregated data table is transferred to a second data processing system associated with the second data pipeline, and wherein the data comparison and the schema comparison are performed at the second data processing system.

20. One or more non-transitory computer-readable mediums comprising computer executable instructions stored thereon which, when executed by one or more processors, cause the one or more processors to:
generate a first aggregated data table based on an output of a first data pipeline, wherein generating the first aggregated data table includes performing aggregations on the output of the first data pipeline to determine aggregation values, wherein performing aggregations on the output of the first data pipeline includes calculating first hash values for respective columns or rows of the output of the first data pipeline, and wherein the aggregation values of the first aggregated data table include the calculated first hash values;
generate a second aggregated data table based on an output of a second data pipeline, wherein generating the second aggregated data table performing aggregations on the output of the second data pipeline to determine aggregation values, wherein performing aggregations on the output of the second data pipeline includes calculating second hash values for respective columns or rows of the output of the second data pipeline, and wherein the aggregation values of the second aggregated data table include the calculated second hash values;
perform a data comparison between the first aggregated data table and the second aggregated data table to determine a data differentiating table, wherein the data comparison includes comparing respective pairs of the calculated first hash values and the calculated second hash values;
perform a schema comparison between the first aggregated data table and the second aggregated data table to determine a schema differentiating table;
generate a first output validation score based on the data differentiating table;
generate a second output validation score based on the schema differentiating table; and
generate a summary comprising both the first and second output validation scores.

* * * * *